Dec. 22, 1942.   J. F. SILHAVY   2,305,641
METHOD OF AND APPARATUS FOR MAKING BEER
Filed Oct. 6, 1936   2 Sheets-Sheet 2
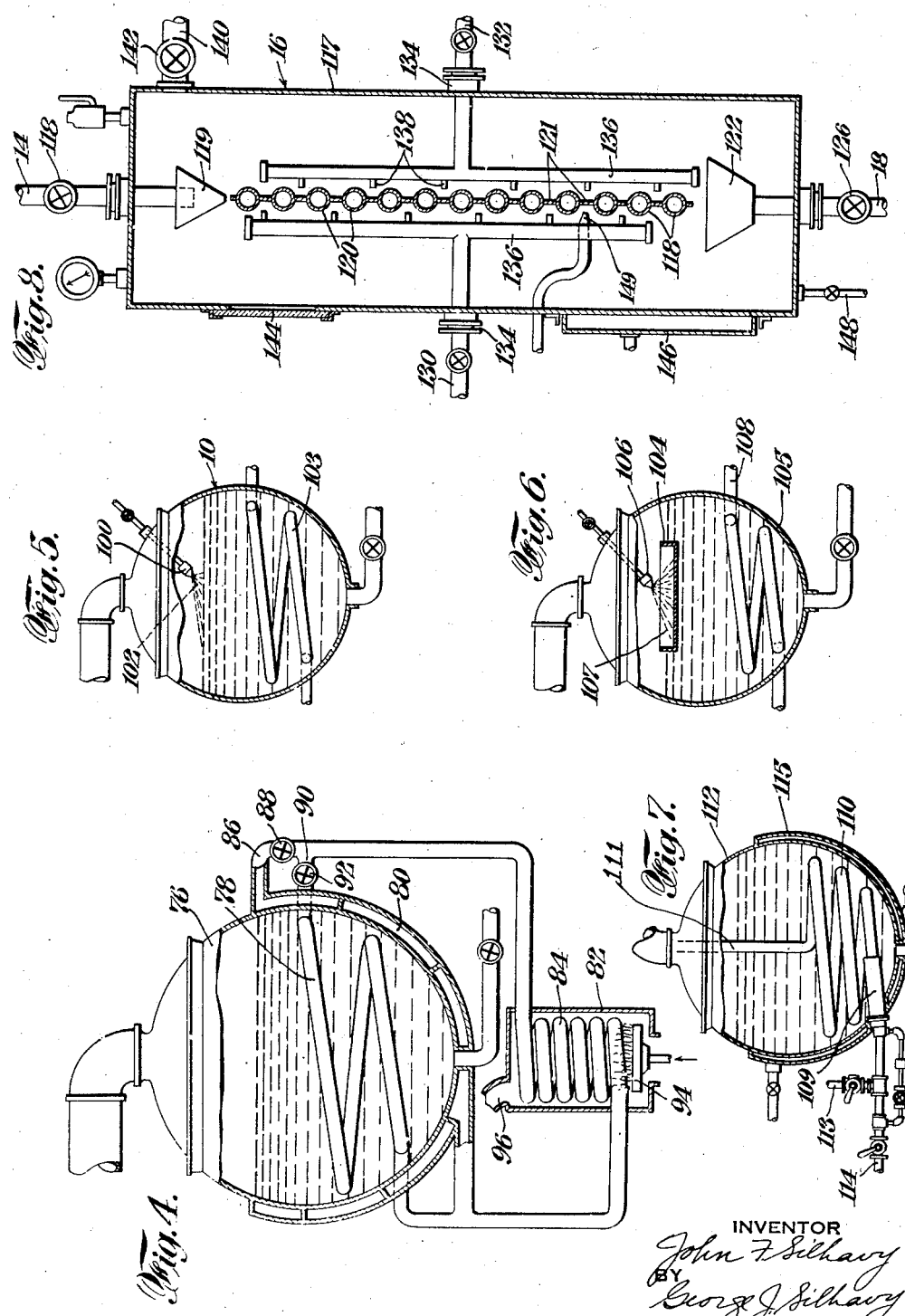
INVENTOR
John F Silhavy
BY George J Silhavy
ATTORNEY Patented Dec. 22, 1942

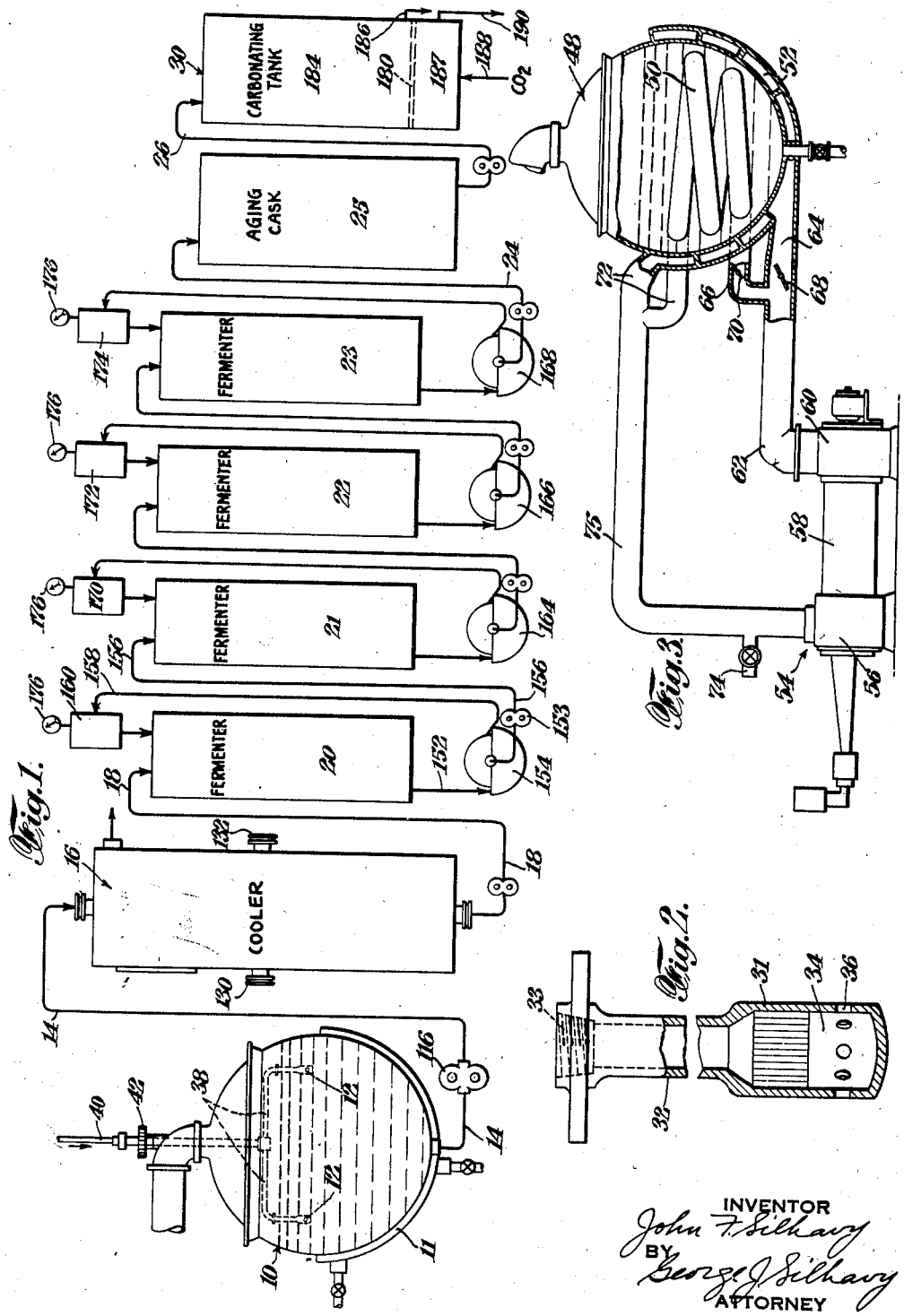

2,305,641

UNITED STATES PATENT OFFICE 2,305,641

METHOD OF AND APPARATUS FOR MAKING BEER

John F. Silhavy, Saginaw, Mich.

Application October 6, 1936, Serial No. 104,187

4 Claims. (Cl. 99—278)

In the manufacture of beer the brewing practice has remained fundamentally unchanged in this country for nearly half a century. A few minor improvements in equipment, process, and quality have been introduced, but the method of making beer has remained substantially the same.

I have invented new steps in the manufacture of beer and have also invented new apparatus to be used in the manufacture of beer. My invention includes methods and apparatus which relate to the manufacture of beer starting with boiling the wort with hops and continuing on through the various steps of cooling, fermenting, aging and clarifying, and carbonating, up to the step of filtering. My invention may be conveniently classified under the following brief headings:

I. Boiling the wort.
II. Pressure cooling of the wort prior to the addition of yeast.
III. Controlled fermentation.
IV. Aging and clarification.
V. Carbonation by diffusion.

The main subjects set forth briefly in the above headings will be taken up separately in the above order in the detailed description of my invention contained hereinafter and some variations and additions will be included. I have set forth the best forms of my invention known to me now but I am not to be restricted thereto as they are given only by way of illustration and may be modified in many particulars.

In the drawings:

Fig. 1 represents a partly diagrammatic showing of an arrangement in a brewery including a hop kettle provided with one form of high temperature heating means, pressure cooler, fermenters, aging tank and carbonating tank;

Fig. 2 represents an enlarged vertical section of one form of burner which can be used in the hop or brew kettle;

Fig. 3 represents a modified hop kettle using a different heating means including high velocity high temperature gases;

Fig. 4 represents another hop kettle with another form of a heating means therefor including high temperature vapors;

Fig. 5 represents a brew kettle provided with a different means of heating and treating the wort where a naked flame plays on the surface of the wort;

Fig. 6 represents still another form of heating and treating the wort where a flame of a burner strikes a shallow pan on top of the wort;

Fig. 7 represents another form of my invention including heating and treating means using an enclosed burner within the hop kettle; and Fig. 8 represents a more detailed showing of my new pressure cooler.

Referring now to the drawings, the arrangement shown therein will be briefly described. The reference character 10 designates a brew kettle jacketed as at 11 and having submerged burners 12 of a known type. A pipe 14 connects the kettle with a pressure cooler 16. This pressure cooler is connected by pipe 18 with fermentation tanks 20, 21, 22 and 23. From this battery of tanks the liquid is pumped through pipe 24 to aging and clarifying cask 25 and then through pipe 26 to a carbonating tank 30. From tank 30 the beer is conducted to filters, storage containers or the like. The tanks may be of any suitable size to accommodate the brews being made and the number of tanks may be increased over the number shown in the drawings or the number may be varied. The constructions shown on the drawings will now be described more fully in connection with the headings given above.

I. *Boiling the wort*

In present day brewing practise practically all the brew kettles in this country are steam heated, that is, they are either equipped with a steam jacket around the outside of the kettle or with a steam coil within the kettle.

I have invented new methods of and apparatus for heating and boiling wort in the brew or hop kettle which will be described in connection with the drawings. My invention is easily adaptable to and can be easily installed in existing kettles. When steam at 25 pounds gage pressure is used as a heating medium in the coil or jacket of a brew kettle, the temperature of the steam is about 265° F. According to my invention I employ heating means and mediums for the brew kettle which range in temperature from about 600° F. to about 2000° F. so that high heating temperatures far beyond those attainable by steam at ordinary pressures are obtained and by this new heating I obtain new and distinct advantages. In my heating systems I use high temperature heating mediums or means which are at a temperature greatly in excess of steam as now used and the wort is contacted with extremely hot surfaces or extremely hot gases. I have shown several ways in which these high and increased temperatures may be obtained but I am not to be restricted thereto as any heating medium or means which produces high temperatures much hotter than steam and greatly in excess of the temperature of steam at ordinary pressures as now used will be suitable for producing the high temperatures used in carrying out my invention.

One apparatus for practising my invention for heating and boiling the liquid mixture in the brew kettle is represented in brew kettle 10 in Fig. 1 where a submerged burner or burners are used and submerged combustion is obtained. Gas and air are mixed in proper proportions and the mixture is burned below the surface of the liquid mixture in the brew kettle. In Fig. 2 I have shown a simple form of a burner 31 which can be used but other submerged burners providing submerged combustion with high temperatures can be used. The burner has a tubular portion 32 with a threaded end 33, a combustion chamber 34 and outlet ports 36 for the combustion gases adjacent the combustion chamber. Gaseous fuels are preferably used and such fuels may be mixed with air in stoichiometric proportions in an industrial carburetor or the like and then forced under pressure through the tubular portion 32 and through the burner, being burned in the combustion chamber. By using excess gas a reducing flame is produced and by using excess air an oxidizing flame is obtained. Preferably purified gases such as hydrogen, $C_2H_2$ methane, or the like are used. The mixture of fuel and air is burned beneath the surface of the liquid mixture in the brew kettle. The burner may be positioned at any suitable height in the brew kettle but the burner should be placed sufficiently deep in the liquid being heated whereby the combustion gases will give up their heat to the liquid as they bubble through the liquid wort, and so that the gases of combustion in escaping will not carry off valuable heat. The ideal position of the burner is to have the temperature of the outgoing combustion gases and the wort about the same.

One or more of these burners can be installed in each kettle, depending on the size of the burner or the size of the kettle. The burners are small and can be readily removed for cleaning between brews, if necessary. On account of the very hot combustion gases coming in direct contact with the wort because there is no separating wall between the fire and the liquid to be heated, the coefficient of heat transfer is extremely high. The local overheating of the liquid mixture as it comes in momentary contact with the hot gases of combustion and the hot body of the burner, will cause rapid ebullition at such points and consequently will greatly increase the circulation of the whole liquid mass. While the rate of ebullition is greatly increased by this type of burner, there is no marked increase in evaporation losses since the evaporation of liquid is substantially compensated for by the condensation of water from the combustion of the gases. I may use other heating mediums or medium such as steam in the jacket 11 of the kettle or in a coil, in addition to high temperature heating and treating obtained by the submerged burner or burners.

In Fig. 1 and in brew kettle 10 I have shown an installation of submerged burners in a brew kettle to obtain heating and treating by submerged combustion with a very high temperature heating medium. In this particular construction the burners 12 are attached to a tubular rotatable arm 38. For smaller kettles, the burner or burners need not be revolved. The rotatable arm 38 comprises a tubular member 40 for introducing combustible fluid mixtures to the burners. The rotatable arm 38 extends from the brew kettle and is suitably supported, and suitably rotated by means of gear 42. By revolving the burners, the whole mass is kept in motion to bring the hot combustion gases from the burners into unheated portions of the liquid in the brew kettle.

By heating with submerged combustion and by the resulting local overheating of the hopped wort mixture I obtain caramelization, effective coagulation of precipitatable albumens, increased circulation and more vigorous and intensive boiling than with present steam heated kettles. With my increased heating I obtain a better hot "break." The beer brewed from a wort treated according to my invention has increased palatability, high stability and better head retention than beers as now brewed.

Another form of apparatus which may be used according to my invention to produce high temperatures in heating the hopped wort mixture is shown in Fig. 3 where the tank or kettle 48 is provided on its interior with a coil 50. As shown in Fig. 3 the kettle is provided on its exterior with a spiral jacket 52 which surrounds the major portion of the kettle 48 but this jacket may be omitted if desired or it may be made smaller to cover a smaller portion of the exterior of the kettle. I have shown a coil and a jacket and either coil or jacket alone or both together may be used. Exterior to the tank is a burner 54 for burning gas, oil, or any suitable fuel in order to obtain high temperature combustion gases. The burning gases are passed from combustion chamber 56 to combustion tunnel 58. A fan or blower 60 is provided at the end of tunnel 58 to force the hot combustion gases through the inlet chamber 62 having branched passages 64 and 66 leading to the bottom of jacket 52 and bottom of coil 50. Dampers 68 and 70 are provided for branch passages 64 and 66 so that the amounts of combustion gases passing to the coil and jacket may be controlled or either the coil or jacket may be cut out. A branched pipe 72 connects the top of the jacket and top of the coil with the combustion chamber 56 and the hot combustion gases are recirculated and heated to a higher temperature by adding more fuel and air. Instead of a spiral jacket I may use any other form of jacket.

In order to obtain a high rate of B. t. u. or heat transfer, the combustion gases must be circulated at a very high velocity through the coil 50 and the jacket 52 if it is used and this is accomplished by the fan or blower 60. To obtain a high efficiency and maintain economic heating, the outgoing gases are reheated and recirculated in the apparatus. The temperature of the heating gases is about 700° F. to about 1100° F. In this method of heating either gas or oil can be used as fuel, since the products of combustion do not come in direct contact with the wort, and, therefore, there is no danger of contamination. A vent 74 is included in return pipe 75 leading from branched pipe 72 to permit escape of excess gases of combustion. The fuel and air are conducted to chamber 56 in proper proportions. Known apparatus for high velocity gas heating systems may be used.

Another method of heating a hop kettle 76 is shown in Fig. 4 where an apparatus including an internal coil 78 and an external jacket 80 is represented. The coil 78 and jacket 80 are connected with a boiler 82 for heating the heating coil 84 containing the liquid metal or compound hereinafter set forth. The pipe leading from the top of coil 84 has one branch 86 having a valve 88, branch 86 being connected with the jacket 80, and another branch 90 with a valve 92, branch 90 being connected with coil 78. The amounts of heating fluid passing to the coil 78 and jacket 80 may be controlled or regulated or either the coil or jacket may be cut out by means of the valves 88 and 92. Instead of using only one heating medium I may use steam in the jacket as an ordinary heating means and a liquid metal or compound in the coil to produce local overheating and high temperatures to treat the hopped wort. If ordinary heating means such as steam is used in addition to the high temperature heating means, the coil and jacket would then form parts of separate systems. Either the coil or the jacket may be omitted if only one heating system is used. The lower part of the heating coil 84 and the lower parts of coil 78 and jacket 80 are connected to form a closed circuit. A burner 94 is positioned within the boiler 82 for heating the liquid within coil 84. A vent 96 is provided for the boiler 82.

To produce my high temperatures for the purposes above set forth, I employ a liquid metal or a high boiling chemical compound. As metals I can use mercury, molten sodium, molten potassium, sodium-potassium alloys or other similar alloys, and as chemical compounds I can use diphenyl or diphenyl oxide or similar compounds, or a mixture of diphenyl and diphenyl oxide or a mixture of other high boiling compounds which have substantially no decomposition at high temperatures. The substances above set forth can be used as liquids or as vapors, but are preferably used as vapors. It is to be noted that the boiler 82 is positioned beneath the kettle 76 so that as the vapors are condensed and give up their heat to the wort, the condensed liquid runs back by gravity to the boiler to be vaporized again. When very high boiling point substances, such as, sodium or potassium or the like are used, it is necessary that the closed heating system above described in which these substances operate be highly evacuated.

Electrical elements or heating plates may be used as heating elements in my apparatus in certain instances.

In the forms of my invention described in connection with Figs. 3 and 4 I also obtain the advantages of caramelization, etc., set forth in connection with the description of the form of my invention described in connection with Fig. 1.

Instead of using the heating means above set forth in Figs. 1, 3 and 4, I can use the form shown in Fig. 5 which includes a kettle 96 having a burner 100 supported in any suitable manner, the burner extending through the kettle adjacent the top of the wort but in which the naked flame 102 plays and impinges on the top of the liquid and the burner is not submerged. More than one burner may be used, if desired. Other heating means as heating coil 103 are used in addition to this burner or burners unless a large number of such burners is used. If a large number of burners is used without steam or other ordinary heating means, it is preferable to agitate the liquid so as to boil and treat the entire volume of liquid.

In Fig. 6 I have shown another form of heating. A shallow pan 104 rests on top of the liquid in kettle 105 or is held on top of the liquid and a burner 106 in use projects a flame 107 against the top surface of the pan 104. The boiling wort comes in contact with the bottom of the hot shallow pan to cause a local over- heating of the liquid. More than one burner may be used if desired and other heating means may be used in addition to this burner or the liquid may be agitated as set forth in the previous paragraph in the description of Fig. 5. A coil 108 can be used to provide additional heat or treatment for the liquid in the tank.

Another method of obtaining the high temperature required for effecting caramelization, etc., is obtained with the construction shown in Fig. 7 in which an immersion heater is used having a combustion chamber 109, coil 110, and vent 111 positioned in kettle 112. The combustion chamber and coil are within the kettle and are surrounded by the wort. Gas is introduced through valved pipe 113 and air through valved pipe 114 in proper proportions and burned in combustion chamber 109. The hot gases of combustion travel through the coil 110 and give up most of their heat to the wort and then leave through vent 111 and through the vent of the kettle. Automatic gas proportioning means or other automatic systems may be used. At the beginning of the heating, the fuel and air mixture is lighted outside the tank adjacent one end of the combustion chamber.

By the use of a proper gas and air mixture and pressure, the flame can be induced to travel into the coil for a distance, thus assisting materially in heating up the coil to the temperature necessary for caramelization of the wort and treating it to obtain new advantages as above set forth.

A jacket 115 is shown for the kettle and this jacket may be used for receiving steam as an additional heating means to the immersion heater but the jacket may be omitted.

As a heating means it is also within the contemplation of my invention to use high boiling point hydrocarbon liquids, such as mineral or lubricating oils or the like.

Some of the subject matter contained in this application is taken from my copending application for Method of and apparatus for producing wort or the like, Serial No. 729,092, filed June 5, 1934.

The advantages obtained with the other forms of my invention using high temperature heating means or mediums above set forth are also obtained with the forms of my invention just described in connection with Figs. 5, 6 and 7.

It is within the contemplation of my invention to use other heating media such as steam for heating the hopped liquid in addition to my high temperature heating means or media as described in connection with Figs. 1 to 6 inclusive, so that the high temperature heating means or media will be used primarily in this instance to produce local overheating of the wort to impart certain desirable qualities to the wort not obtainable by using steam alone. In other words, my high temperature heating means or media will preferably be used in combination with steam or other heating means, the high temperature heating means or media being used primarily to treat the wort thermally and produce qualities in the wort which are not produced by boiling only with steam. While the submerged combustion arrangement shown in Fig. 1 and the heating systems shown in Figs. 3 and 4 may be used to boil and treat the wort without steam or other heating medium, as a matter of economy, it may be preferable to use a heating medium such as steam to boil the liquid wort and to utilize the high temperature means or media to produce the results above enumerated which can not be obtained by the use of steam alone. My invention includes the use of high temperature heating means which may be used alone to boil and treat the hopped liquid or may be used in addition to and in conjunction with known heating and boiling means such as steam, for example, for boiling and treating the hopped liquid to impart new and desirable qualities to the hopped liquid. The forms of my invention shown in Figs. 1, 5 and 6 are the easiest and cheapest to install and operate and where these conditions are of primary importance, these forms are admirably suited to treat wort to impart desirable characteristics thereto without rebuilding a brew house.

II. Cooling the wort under pressure

After the wort has been properly and sufficiently boiled and treated in any of the above ways, it is pumped by the pump 116 through pipe 14 to the cooler 16 shown in Figs. 1 and 8 where it is cooled down to about 40° F. This cooler is an improvement on a Baudelot cooler in that the cooling of the wort is accomplished under pressure so that better and faster cooler is obtained, "steaming" is substantially reduced and aeration of the wort is obtained during the initial stages of cooling.

The most important function of a Baudelot cooler as used today is to cool the wort to a low temperature so that the wort can be pumped into the cold brewery cellars, and secondarily to aerate or oxidize the wort. The important parts of a standard Baudelot cooler are a distributing trough, a vertical bank of horizontal cooling pipes through which are circulated cold water (upper copper pipes) and ammonia (lower iron pipes) and a collecting pan beneath the iron pipes. The hot wort is conducted to the distributing trough and from this trough it starts its descent over the outside of the cooling pipes and into the collecting pan. From the collecting pan it is pumped to the fermenters in the cellar.

In the present Baudelot cooler used in breweries today, a partial cooling of the wort in its descent over the tubes is necessary before aeration or oxidation can take place to any appreciable extent because when the hot wort starts its descent over the exterior of the tubes, it is hot enough so that a large amount of steam or water vapor arises from it. This happens for about one half the height of the cooler. During this escape of vapor or steam from the hot wort, it is very difficulty for the air to contact the hot wort. Any air which does actually contact the wort will be diluted with water vapor and hence its oxidation function will be proportionately diminished. The only effective portion of the cooler where the air comes in direct contact with the wort is its lower half. After the cooled wort has reached the collecting pan under the tubes, it is covered with a heavy foam which further hinders contact of the wort by the air. Since the cooling is only a matter of seconds it is desirable to have the maximum amount of contact time between air and the wort.

I have improved the well known Baudelot cooler so as to enclose the cooler 16 completely in a housing 117. The top of the housing is connected with the hop kettle by the pipe 14 through which the hot wort is pumped. The housing 117 is constructed so that it will withstand an internal pressure greater than atmospheric. The pressure to be used within the interior of housing 117 is substantially greater by ten or fifteen pounds per square inch than atmospheric. The wort is cooled by the cooler 16 under this pressure. The pipe 14 has a valve 118 by means of which the flow of liquid to the distributing trough 119 is controlled. From the trough 119 the liquid flows down over pipes 120 and fins 121 as in the usual cooler and the pipes 120 are cooled in the usual manner. A collecting trough 122 is provided beneath the pipes and the trough discharges into pipe 18. Pipe 18 has a valve 126 which is opened just enough so that the wort flows out at a given rate under the pressure in the housing 117. Pipes 18 and 14 may be provided with gland fittings to be held tight or may be welded to the housing.

In order to provide fresh air or other gas within the housing 117 I have shown inlet pipes 130, 132 having glands 134 which permit withdrawal of these pipes to allow for cleaning of the cooling pipes and inlet pipes. The inlet pipes are preferably provided with vertical distributing heads 136 having nozzles 138 which direct the air or other gas against the wort on the cooling pipes and fins. Instead of nozzles the heads may be provided with slits or restricted openings. An outlet pipe 140 having a valve 142 is used to conduct away gases from the top of housing 117. As shown in Fig. 8 the distributing heads are positioned on opposite sides of the cooling pipes and the nozzles of each are shown as being in staggered relation to obtain better action. The nozzles provide means of distributing any gas or gases such as sterilized air, oxygen, nitrogen, carbon dioxide, etc., which the brewer may want to use in treating the wort being cooled. Rather than introduce the air or other gas or gases through one large opening, I direct the gas in small streams at the places where most needed, right on the cooling pipes. The air or other gas is merely blown gently against the wort on the cooling pipes so that the wort is not blown from the pipes but by directing the streams against the wort, the undiluted air or gases will come in contact with the wort and in this way do the most good.

The housing 117 is preferably provided with a pressure relief valve, a pressure gage, an observation window 144, access doors 146, and drain pipe 148.

Instead of using air or oxygen containing gases in the distributing heads of the inlet pipes, I may only direct air or oxygen containing gases against the wort on the upper half of the cooling pipes and carbon dioxide or other gas against the wort on the lower half of the cooling pipes. At about the lower tenth of the cooling pipes, I may spray all or part of the yeast in suspension into the wort through nozzle 149 to get a fine distribution of the yeast in the wort. This spraying step may be used with or instead of the controlled fermentation later to be described but the controlled fermentation is the preferred form.

By cooling under pressure in this way I obtain new results. For example, "steaming" is reduced practically to zero. This means that air or whatever gas is admitted into housing 117 through inlet or inlets 130, 132 will come into direct contact with the hot wort as soon as the hot wort enters the distributing trough 119 and during its entire descent over the exterior of the cooling pipes 120. Because of this contact there will result an increased oxidation rate since it is known that chemical reactions increase rapidly with an increase in temperature. As the cooler housing 117 is under internal pressure, the introduced gases or air will have a greater solubility in the wort. In addition to this chemical advantage, the wort will actually come into better physical contact with the cooling tubes 120 thereby eliminating any tendency toward cascading. Better and faster cooling will be obtained using my invention. Other advantages of my enclosing housing 117 and cooling under pressure include cleanliness which helps to prevent contamination of the wort.

III. *Controlled fermentation*

After the wort is cooled to about 40° F. it is pumped through the pipe 18 to the top or other suitable part of the first fermenter 20. I have provided a number of distinct fermentation stages. In the drawings I have shown four fermenter tanks but I am not to be restricted to this number.

Before describing my invention I will generally describe the standard practise in adding yeast to fresh wort. Yeast is removed from a batch of fermented beer and added to fresh cooled wort. Since the yeast has been removed from an alcoholic medium slightly acidified by dissolved $CO_2$ and then is placed in a fresh neutral wort carrying a relatively high percentage of fermentable sugars, it requires a considerable time to acclimate itself to this new environment. In addition during the fermentation period its environment is continually changing since the wort becomes weaker in fermentable sugars and richer in alcohol and other fermentation products as fermentation proceeds. This yeast in the fermenting beer has been at the bottom of the fermenter tank and has been under the pressure of the fermenting wort above it. After the yeast is removed from the fermented wort there is a time interval before it is added to the new wort and the pressure on the yeast is removed. Consequently, when the yeast is added to the fresh wort in a tank, the pressure due to the hydrostatic head of the wort again compresses the yeast and as a result reduces its diffusion surfaces, which condition retards fermenting action. These two factors of new environment and pressure are instrumental in prolonging the so-called "rest" period of the yeast when it is added to the fresh wort.

In the fermentation step of my invention I overcome the objections of the prior practises. In one form of my invention the yeast after it is taken from the fermenter tank is placed in a pressure vessel where it is maintained under pressure greater than atmospheric. Then when the yeast is placed in a new batch of wort it will be subjected to an equal or lower pressure. Usually a lower pressure will be present in the fermenter tank and therefore the yeast will expand slightly and will function more rapidly and will start to work quicker because the pressure conditions are about the same as they were in the previous fermenter tank and pressure vessel. In another form of my invention the medium in which the yeast operates is kept more constant; in other words, the range of the concentrations of the solutions is smaller or the changes in the solution undergoing fermentation in which the yeast operates are much smaller. Instead of having the yeast ferment the wort from about 12° Balling to about 4° Balling in one batch, I divide the fermenting period into a number of distinct phases, as for example four distinct phases so that there are four batches of fermenting solutions and four batches of yeast, each of which passes through a relatively small range of fermentation as compared to the single batch used previously.

In the first form of the invention a large tank of wort is fermented as a batch from about 12° Balling to about 4° Balling but before adding the yeast, the yeast is placed in a pressure vessel and is subjected to about 25 pounds per square inch pressure and kept at this pressure for several hours with or without a small amount of yeast food. When the fermenter tank is to be pitched with yeast, the yeast is immediately transferred to the wort to be subjected to an equal or slightly lower pressure. If the pressure is lower, the yeast will expand slightly and will function more rapidly due to the greater diffusion surface and due to the fact that the pressure conditions in its new environment more nearly approach those existing in the pressure vessel before transfer to the fermenter tank.

In the other form of my invention I utilize a number of fermenting steps so as to obtain specialized yeasts which will operate in smaller ranges of fermentation than in the previous practises. In the drawings I have shown four tanks 20, 21, 22 and 23. These tanks are each of a size large enough to accommodate the brews made in the brew kettle or tank. From the cooler 16 the wort is pumped through the pipe 18 into tank 20 at any suitable point. Yeast is added to this tank at the beginning of the operation at atmospheric pressure or under pressure from a tank later to be described. It is preferable to place the yeast under pressure, but dividing the fermentation into stages without placing the yeast under pressure produces results not heretofore obtainable. In tank 20 fermentation is allowed to proceed for about 2 days or until the wort has gone down to about 10° Balling.

The partly fermented wort is then pumped from the tank through pipe 152 by pump 153 and through a filter 154, the yeast is filtered off and the filtered partly fermented wort is pumped through pipe 156 into the top or any suitable point of tank 21. The yeast from filter 154 and any other yeast which has settled to the bottom of tank 20 is used again for fresh wort of about 12° Balling introduced into tank 20 which will be reduced to about 10° Balling. The yeast from filter 154 will be forced through pipe 158 to a vessel 160. The yeast before being added to the new wort in tank 20 is preferably, but not necessarily, placed under pressure in the vessel 160 shown on top of tank 20 but this pressure step may be omitted. In vessel 160 the yeast may be subjected to a pressure substantially above atmospheric, for example, about 25 pounds per square inch, and kept at that pressure for several hours with or without a small amount of food wort. The pressure can either be produced by the evolution of $CO_2$ in the vessel or by forcing other gas or gases into the vessel.

During this pressure period the yeast will be slightly compressed in volume and it will become acclimated to this pressure and will gradually perform its function under this pressure. When the yeast is taken from vessel 160 and returned to tank 20 with the new wort, it will be subjected to an equal or slightly lower pressure. Usually it will be subjected to a lower pressure and will therefore expand slightly and will consequently function more rapidly on account of the greater diffusion surface on the yeast.

The same procedure is followed for tanks 21, 22 and 23. It is not essential to produce a crystal clear liquid from filters 164, 166 and 168 as a small amount of yeast carried over the following tanks will do no harm. All that is important is to save enough yeast from each filter for the next batch of wort in the preceding tank. As shown in the drawings fermenting tanks (similar to tank 20) 21, 22 and 23 are provided. In tank 21, the wort is fermented from about 10° Balling to about 8° Balling with another batch of yeast. This yeast is filtered out by filter 164 and returned to tank 21 in the same way as described in connection with tank 20 so that this second batch of yeast is utilized to ferment the wort through another small range. In tank 22, the wort is further fermented from about 8° Balling to about 6° Balling with another batch of yeast and in tank 23 from about 6° Balling to about 4° Balling with another yeast. For each tank 21, 22 and 23 I have provided vessels 170, 172 and 174 and while they are preferably under pressure because this improves fermentation, the pressure is not essential. Each tank may be provided with a pressure gage 176.

From the above it will be seen that the environments in which the yeasts function are more constant and the ranges are much smaller with the result that each batch of yeast operates in practically a solution of constant concentration and therefore is never subjected to a sudden change as is now the practice. By my method specialized yeasts are developed which will produce better and more efficient fermentation. Also, the time of fermentation is shortened. It is to be understood that I do not restrict myself to the Balling readings given or the number of tanks or the time of fermentation in each.

IV. *Aging and clarification*

From the fermenters the fermented wort is pumped to storage tanks of a size to accommodate a brew, one of which is shown at 25 in the drawings. In these storage tanks aging and clarification take place, both of which processes are aided by increased surface conditions. In the present day breweries larger and larger storage tanks are being used with the result that the ratio of surface to volume becomes smaller and smaller and the rate of aging and clarification is proportionately reduced.

Various chips and the like have been proposed for clarifying beer but they have not proved entirely successful. In my tank 25 I employ strips or ribbons which can be plain, perforated or corrugated. The desired amounts of these strips or ribbons are placed in the bottom of the storage tank 25 whence they will arise to the top of the beer as it is admitted into the tank. Then gradually as the particles of yeast adhere to them these strips will settle to the bottom of the tank, carrying with them the yeast and other suspended particles. The thickness of the strips or ribbons varies with the material used and also can be varied to suit individual conditions.

The material for these strips or ribbons may be of cellulosic material or of light metal foil such as "Dowmetal" but I prefer to coat or spray the strips or ribbons with absorbent substances such as, carbon black, charcoal, bone black, celite, talc, silica gel, wood flour, sand dust etc. to bond these substances to the surfaces of the strips or ribbons to increase the tendency for suspended particles to adhere to these substances and to the strips. These substances can be bonded to the strips with any well known cement or adhesive. For example, the strips may be coated with a resin solution or pyroxylin cement and the substances dusted thereon before the solution or cement dries, care being taken to leave a large portion of the carbon or other particles uncoated or exposed. The correct choice of these bonded substances will also have a bearing on the rate of fall of these strips through the beer being aged and clarified.

In addition to the substances named above I may use mineral wool, asbestos and zonolite.

I may also wish to improve the quality of beer especially as regards its physiological effect upon the human system. It is a well known fact that beer has a tonic and food value but that it also acts as a sedative. I propose to counteract or offset this sedative effect to an appreciable extent by adding to beer ingredients such as caffein (theine), theobromine, etc. It has been shown that these ingredients in minute quantities speed up the movements and reaction time of the drinker so that the addition of these ingredients in minute quantities to beer will neutralize the sedative effects of the beer. I propose to add about $\frac{1}{10}$% of these stimulants but I do not restrict myself to this amount nor to the addition of them to the beer at this point as they may be added at an earlier or later stage.

There is a further and important advantage to be gained by the addition of caffein (theine), or theobromine, etc., or combinations thereof, and that is that these compounds prevent the action of bacteria and yeast in the finished product. As a result, spoilage and haziness are reduced and consequently beer will keep a longer time without any pasteurizing step or with only a milder degree of pasteurizing. Since pasteurizing has a deleterious effect on the flavor of beer, any step which can effectively eliminate or reduce this deleterious effect of pasteurizing is valuable. These preservative or antiseptic compounds may be added to the beer at any point after the main fermentation is completed.

V. *Carbonation by diffusion*

After the beer has been aged and clarified it is ready for carbonation or charging with $CO_2$ gas. In my process this carbonation is done by diffusing the $CO_2$ gas through a semi-permeable membrane or material of a porous nature having openings of a size to permit diffusion of $CO_2$ mainly.

I have shown a tank 30 provided with a semi-permeable membrane 180 near its bottom. Beer to be carbonated is forced through line 26 into the top chamber 184 of the tank and is taken from the tank through line 186 in a carbonated condition. Beneath chamber 184 and membrane 180 is a $CO_2$ generating chamber 187. Fermenting wort is pumped into chamber 187 and this fermenting wort contains fermentable sugars and yeast and continuously forms fresh $CO_2$ gas. I may use $CO_2$ from a different source in chamber 187 than from a fermenting wort in this chamber. The chamber 187 has inlet 188 and outlet 190. This freshly formed $CO_2$ gas will collect under the membrane 180 and diffuse into the beer above in chamber 184. This method of carbonation is very effective and economical since the diffused $CO_2$ exists as minute bubbles and is easily dissolved in the beer being carbonated. Only diffusible matter will pass through the semi-permeable membrane and substantially no colloidal material or cloudy material will pass through the membrane. Any yeast cells which may migrate into the aged beer will be very small in amount and can be readily removed by filtration later.

From tank 178 the carbonated beer is passed to storage tanks, to filters, to racking tanks or is treated in any way as in the general practise with carbonated and finished beer.

It is to be expressly understood that my high temperature treating of the wort as above given may be used to treat other malted liquids which are similar to beer, such as ale, for example, or other malted liquids where the above mentioned advantages are desired; that the pressure cooling apparatus and method may be used with other liquids than beer especially where it is desirable to impregnate the liquid with air or other gases; that the fermentation steps disclosed above of placing the yeast under pressure before use, and of dividing the fermentation into distinct steps are not restricted to beer making but may be used with other fermentable substances or liquids which are to be fermented with yeast; and the carbonation steps may be used to carbonate any beverage desired and are not restricted to beer.

What I claim is:

1. A method of treating a malted liquid while it is being cooked in a tank which comprises directing a flame against a shallow metal pan contacting the surface of the liquid so that the liquid is subjected to exceedingly high temperatures to cause caramelization and improved quality thereof.

2. An apparatus of the character described adapted for cooking and treating malted liquids, including, in combination, a tank adapted to receive a malted liquid to be boiled, and a high temperature heating means adapted for heating the liquid in the tank, said means including a coil within said tank and adapted to be submerged in the liquid therein, a burner for producing hot gases of combustion outside of said tank, and means including a blower between said tank and said burner for forcing and circulating hot gases of combustion from said burner through said coil at a high rate of speed to cause overheating and caramelization of the malted liquid.

3. A method of treating a malted liquid while it is being boiled in a tank which comprises burning fuel within said tank and directing the flame and hot products of combustion against a metal pan resting on the surface of the liquid in said tank so that said pan is overheated and the liquid in contact therewith is overheated and subjected to caramelization.

4. An apparatus of the character described adapted for cooking and treating malted liquids, including, in combination, a tank adapted to receive a malted liquid to be boiled, and a high temperature heating means adapted for heating the liquid in the tank, said means including a coil within said tank and adapted to be submerged in the liquid therein, a burner outside said tank for producing hot gases of combustion, and means including a blower for circulating hot gases of combustion from said burner thru said coil at a high rate of speed to cause overheating and caramelization of the malted liquid and said last mentioned means including a return conduit communicating with said coil and said burner for recirculating to said burner at least a portion of the hot gases of combustion after they have passed thru said coil.

JOHN F. SILHAVY.